United States Patent [19]
Vuylsteke

[11] Patent Number: 5,333,065
[45] Date of Patent: Jul. 26, 1994

[54] SIGNAL TO DENSITY MAPPING WITH CONTROLLED CONTRAST

[75] Inventor: Pieter Vuylsteke, Antwerpen, Belgium

[73] Assignee: AGFA-Gevaert, Mortsel, Belgium

[21] Appl. No.: 978,091

[22] Filed: Nov. 17, 1992

[30] Foreign Application Priority Data

Dec. 9, 1991 [EP] European Pat. Off. ........ 91203209.1

[51] Int. Cl.⁵ .............................................. H04N 1/46
[52] U.S. Cl. .................................. 358/456; 348/571
[58] Field of Search ................. 358/75, 78, 80, 166, 358/456, 520, 521, 522, 527; 250/327.2

[56] References Cited

U.S. PATENT DOCUMENTS

| | | | |
|---|---|---|---|
| 4,276,473 | 6/1981 | Kato et al. | 250/327.1 |
| 4,306,290 | 12/1981 | Kato et al. | 358/166 |
| 4,410,909 | 10/1983 | Ueda et al. | 358/80 |
| 4,851,675 | 7/1989 | Saotome et al. | 250/327.2 |
| 4,984,071 | 1/1991 | Yonezawa | 358/80 |

*Primary Examiner*—Stephen Brinich
*Attorney, Agent, or Firm*—Richard J. Birch

[57] ABSTRACT

A method of determining a conversion of a digital image representation of a radiologic image into density values wherein the gradation curve of a conventional screen/film system is approximated.

14 Claims, 6 Drawing Sheets

SIGNAL TO DENSITY MAPPING WITH CONTROLLED CONTRAST

DESCRIPTION

1. Field of the Invention

The present invention is in the field of digital image processing. The invention more specifically relates to a method of creating a gradation curve, i.e. a curve representing the relationship between the optical density of a reproduced image and the corresponding digital signal value.

2. Background of the invention

In the field of digital radiography a system has been developed wherein x-rays transmitted by an exposed object are stored on a photostimulable phosphor screen.

The photostimulable phosphor screen is read-out by stimulating it with laser light so that it liberates its latent image by the emission of image-wise modulated light. The emitted light is then detected and convert into an analog electrical representation for example by means of a photomultiplier. The signal is then digitized, processed and subsequently used to control the hard copy recording in image reproducing system such as a laser recorder. For diagnostic purposes the reproduction is viewed and analysed on an lightbox.

Examples of photostimulable phosphors that can be used are extensively described in European patent application 91200511.3 filed on 8.03.91.

In conventional radiographic systems the optical density on the film is a function of the exposure dose. The variation of the density relative to the exposure dose (or the logarithm of the exposure dose), commonly referred to as the gradation curve or the sensitometric curve of the recording material is for each type of recording material optimized with respect to the application for which that type of material was developed.

Optimization of the gradation curve i.a. means that the slope of said curve, that is a measure of the contrast rendition in each density region, is high enough so as to enable discerning the most subtle detail when examining the reproduction on a light-box taking into account the perceptibility characteristics of the human eye as a function of the intensity, the available density range and the relative diagnostic importance of different densities in the image to be reproduced.

This aspect is different in digital radiography since in such a system the recording medium and reproduction medium are not identical. Therefore a relation has to be explicitly defined between the digital signal representative of the light emitted by the phosphor upon radiation and the corresponding density on the recording material. This relation will further on be referred to as the digital gradation curve.

Implementation of a digital gradation curve is a relatively simple task. Due to the large number of degrees of freedom and the large number of parameters that can be set many gradation curves suited for different types of applications can be defined.

However, when such a large number of gradation curves needs to be stored in an electronic memory a lot of storage capacity is required.

In European patent specification EP 0 110 185 this problem has been described. According to this disclosure the problem is solved by a method of obtaining many desired gradation curves from about one of several (about ten) basic gradation curves by rotating or parallel shifting the basic gradation correction curve according to the object, the radiation source voltage, the purpose or the like.

U.S. Pat. No. 4,276,473 issued Jun. 30, 1981 also relates to the conversion of digital signal values representing a radiologic image into corresponding density values. The level of the electric signal is converted in such a way that the maximum value of the electric signal corresponding to maximum density of the radiation image is converted to a level resulting in a certain value of the optical density of the reproduced image on the recording material. The minimum level corresponding to the minimum density is converted to a level resulting in the fog density of the recording material.

Hence a signal range that is entirely dependent on the read-out image information is mapped onto a fixed density range. When however the latitude of the read-out signal range varies, for example because the fysionomy (the thickness) of the exposed patients varies, the average contrast in the reproductions will also vary. There is no control on the variation of the contrast obtained in hard copies of images with different information content.

OBJECTS OF THE INVENTION

It is an object of the present invention to provide a method for image reproduction wherein a gradation curve is used for converting digital image signals obtained by reading out an image stored in a stimulable phosphor screen into corresponding density values in the reproduction.

It is a further object to provide such a method wherein said curve is defined by means of a set of parameters that are familiar to the radiologist who is acquainted with classical radiology wherein the recording material and the reproduction material are the same conventional photographic film for x-ray applications.

STATEMENT OF THE INVENTION

In accordance with the present invention the above objects are achieved by an image reproducing method comprising the steps of scanning a stimulable phosphor screen storing a radiation image with stimulating rays, detecting the light emitted upon stimulation and converting it into a digital signal representation and creating a gradation curve for mapping the signal values of said digital signal representation onto corresponding density values and recording a hard copy image on a recording material taking into account said gradation curve, characterised in that said gradation curve is created by the steps of

- defining a canonical monotonical non-constant function $Y(x)$ in an orthogonal coordinate system $(x,y)$ between arbitrary values $x_0$ and $x_1$ and $Y_{min}$ and $Y_{max}$,
- determining minimum and maximum density values $D_{smin}$ and $D_{smax}$,
- determining minimum and maximum signal values $S_{min}$ and $S_{max}$ constituting a range wherein the gradation is defined by the canonical form and outside of which signal values will be mapped onto $D_{smin}$ or $D_{smax}$,
- defining the gradation curve as $$D(s) = D_{smin} + (Y(x(s)) - y_{min}) \cdot (D_{smax} - D_{smin}) / (Y_{max} - Y_{min})$$

wherein $D(s)$ is the density in the reproduction as a function of the signal value s, $x(s) = x_0$ if s is smaller than or equal to $S_{min}$,
$x(s) = x_0 + (s - S_{min}) \cdot (x_1 - x_0)/(S_{max} - S_{min})$ if s is comprised between $S_{min}$ and $S_{max}$, and
$x(s) = x_1$ if s is larger than or equal to $S_{max}$.

A gradation curve is a curve representing the conversion of digital signal values into corresponding density values envisioned in the hard copy.

In a preferred embodiment the parameters $S_{min}$, $S_{max}$, $D_{smax}$ and the canonical function $Y(x)$ are determined as a function of the type of examination performed. $D_{smin}$ is determined by the characteristics of the recording material used. In the case of a photographic recording material it is about equal to the fog density (e.g. $D = 0.2$).

The shape of the canonical function $Y(x)$ preferably approximates the shape of a gradation curve of a conventional photographic x-ray film the radiologist is used to work with.

When the definition of a specific gradation curve representing a conversion from digital signal values into density values is performed starting from a predetermined function in a canonical form, then a calibration of the two axis of an orthogonal coordinate system wherein the canonical form is defined, is required. (cfr. FIG. 3 referred to herinafter).

The calibration of the density axis is determined by the values $D_{smin}$ and $D_{smax}$ that are a function of the inherent characteristics of the recording material and of the type of examination.

The signal axis of the digital gradation curve that is defined is calibrated by $S_{min}$ and $S_{max}$. In between these values the conversion of digital signal values into density values is determined by the canonical function, signal values smaller than $S_{min}$ will be mapped onto $D_{smin}$ and signal values larger than $S_{max}$ will be mapped onto $D_{smax}$. This transformation is obtained by means of the function x(s) as defined hereinbefore.

It was the inventor's object to provide a digital gradation curve that is characterised by parameters that are familiar to the radiologist who is experienced in the field of conventional radiography.

A specific photographic quantity that is very familiar to the radiologist is the "exposure latitude" of a conventional radiographic film. A typical latitude value is 1.5.

Therefore in a preferred embodiment of a method as hereinbefore described the range between $S_{min}$ and $S_{max}$ is constant and equal to a predetermined envisioned latitude L in the hard copy, so $S_{max} = S_{min} + L$.

Once the range between $S_{min}$ and $S_{max}$ is determined, it is still required to determine the position of this determined range on the signal axis, more specifically the position of this range relative to the range of the image signal values obtained by reading out the photostimulable phosphor screen.

According to this invention this is performed by taking into account the statistical information of the read-out image signal, more specifically the image histogram.

By evaluation of the image histogram the relevant signal range being the range comprising information that is relevant for diagnostic purposes is determined.

Then an alignment is performed of a signal value located at a predetermined relative position within the range defined by $S_{min}$ and $S_{max}$ wherein the canonical function is applicable with a point located at the same predetermined relative position within the relevant signal range. For example 62% of the signal range whereto the conversion via the canonic function is confined is aligned with 62% of the relevant signal range.

For reproducing images represented by a digital signal representation the mapping of a fixed predetermined range onto corresponding density values is advantageous relative to the mapping of a data-dependent range because in the former case the gradation obtained in the hard copy will be constant. The information that is important for the radiologist when making a diagnosis is contained in the image contrast (i.e. in density differences), so the control of the contrast rendition is most important. This direct control of the contrast rendition is obtained by the method of the present invention.

In the alternative case in which the range that is mapped onto density values is without any limitations dependent on the image information, a change of the signal range brings about an implicit rescaling of the gradation curve. This has an effect on the average contrast in the hard copy. As a result hereof the gradation of the hard copy image may for example vary considerably in dependence on the thickness of the irradiated patient.

However, the use of a fixed signal range has disadvantages too. Indeed, when the range of diagnostically relevant data determined by evaluation of the image histogram is larger than the fixed signal range to which the conversion is confined, a part of the diagnostically relevant data will be mapped onto the minimum or maximum density so that the local image contrast in these parts of the image is equal to zero.

To solve this problem the present invention provides an alternative embodiment of the described method wherein the range between $S_{min}$ and $S_{max}$, earlier referred to as the latitude, that is mapped onto density values in between $D_{smin}$ and $D_{smax}$ is adjusted to the dimensions of the range wherein relevant histogram data are found within given margins so that the corresponding variations of the slope of the gradation curve determined as hereinbefore described, will be controlled.

The choice between the two above described particular embodiments of the present invention is preferably made in dependence of the type of examination and will commonly be provided for the user in the form of a menu on screen.

A hard copy image can be obtained by scanning a photographic recording material with a laser beam that is modulated so as to produce in each pixel on the recording material the specific density value that corresponds with the read-out signal value in said pixel taking into account the above-described gradation curve.

Other recording methods such as thermal sublimation transfer recording may be envisioned. The process of thermal sublimation transfer comprises placing a dye layer of a donor element in face-to-face relation with a dye receiving layer of a receiver sheet and image-wise heating from the back of the donor element.

For supplying heat energy thermal heads, laser light, infrared flash or heated pens can be used.

Alternatively the support of the dye-donor element may be an electrically resistive ribbon wherein current is injected by electrically addressing a print head electrode resulting in a highly localised heating of the ribbon beneath the relevant electrode.

BRIEF DESCRIPTION OF THE DRAWINGS

Particular aspects of the present invention as well as preferred embodiments thereof will be explained by means of the corresponding drawings wherein FIG. 1 generally shows a system for reading out an image stored in a photostimulable phosphor screen.

Figure 1:
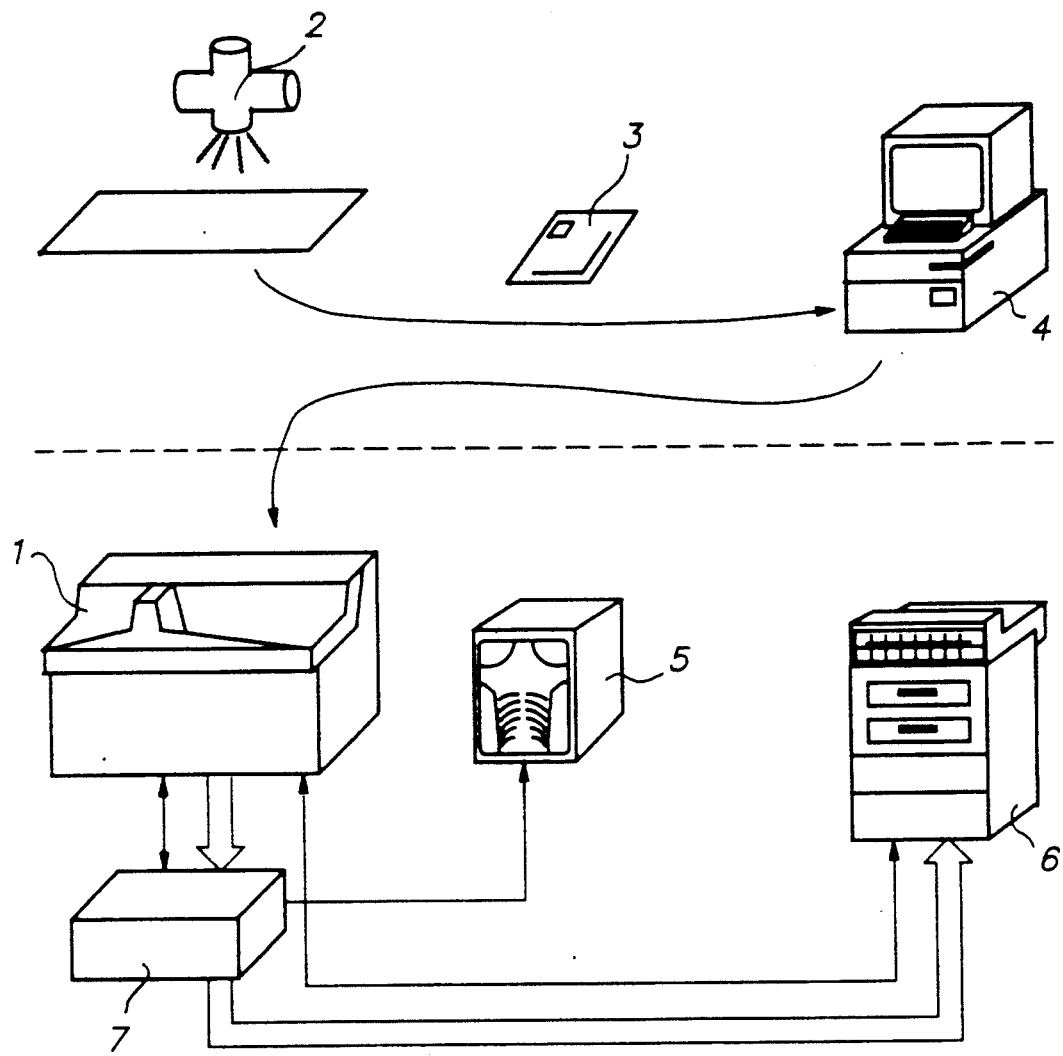
FIG. 1 generally shows an apparatus in which the method of the invention can be applied.

A radiation image of an object was recorded on a photostimulable phosphor screen (3) by exposing (2) said screen to x-rays transmitted through the object (not shown). The stimulable phosphor screen was conveyed in a cassette (3) provided with an electrically erasable programmable read only memory (EEPROM). In an identification station 4 various kinds of data, for example patient identification data (name, date of birth) and data relating to the exposure and/or to the signal processing were recorded onto the EEPROM.

In a radiation image read-out apparatus 1 the latent image stored in the photostimulable phosphor screen was read-out by scanning the phosphor screen with stimulating rays emitted by a laser. The stimulating rays were deflected into the main scanning direction by means of galvanometric deflection. The subscanning was performed by transporting the phosphor screen in the subscanning direction. The stimulated emission was directed onto a photomultiplier for conversion into an electrical image representation.

Figure 2:
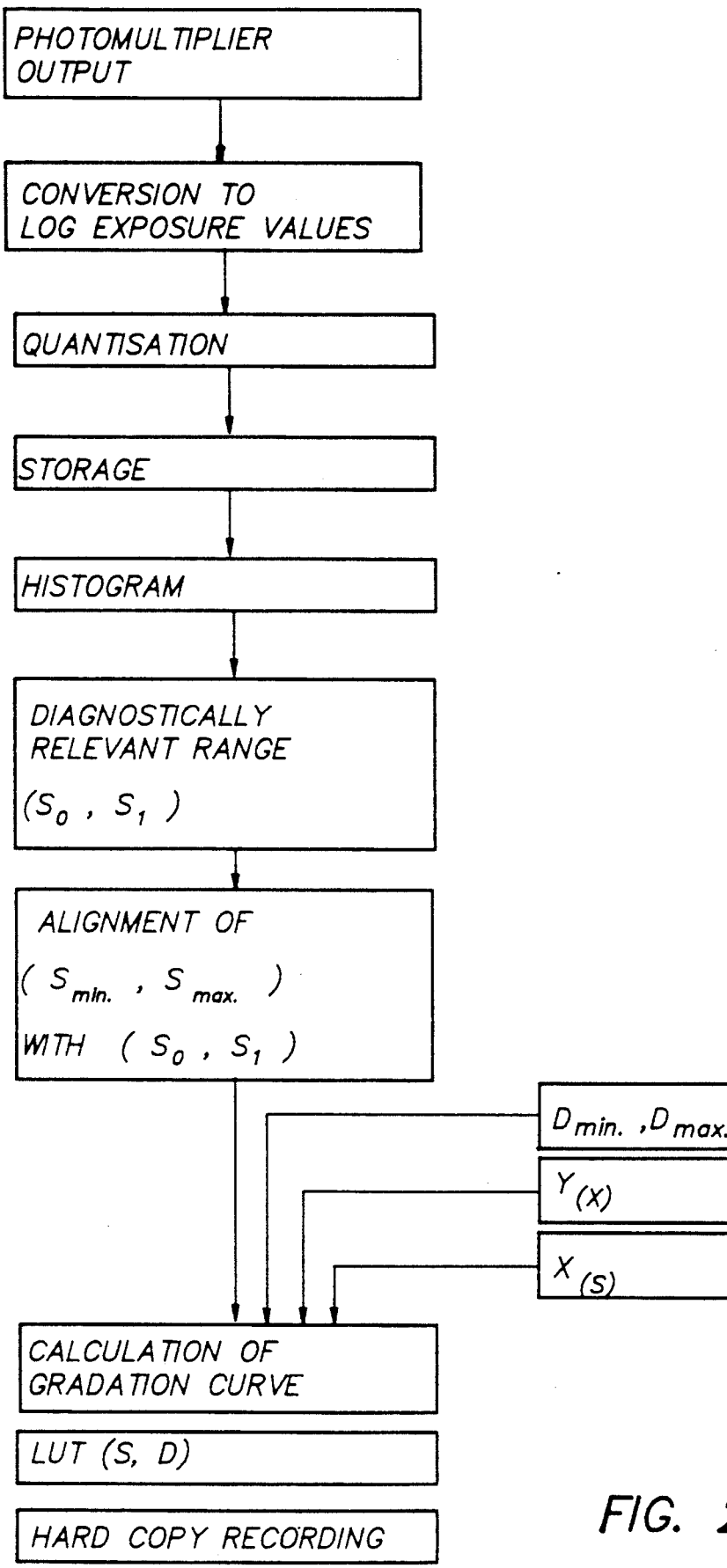
FIG. 2 is a block scheme illustrating the data flow.

The subsequent data flow is illustrated in FIG. 2. The output signal of the photomultiplier was converted into a logaritmic quantity log E (E being the exposure value),and next the signal was quantised. This quantised image signal, called the raw image signal, was sent to the image processor (FIG. 1, numeral 7) where it was stored in an internal buffer. Without any modifications it was also sent from the image processor to the review console 5 where it was temporarily stored on a hard disc. This back up ensured that the signal was never lost, even not when any of the components of the apparatus would fail and that the signal could be retrieved for any kind of later processing, for example processing with different parameter setting. This feature could be used when the result of the on-line processing was unsatisfactory due to bad exposure conditions or inadequate selection of the processing parameters.

Next the curve representing the mapping of signal values (in this case log exposure ) values into corresponding density values was to be determined.

Figure 3:
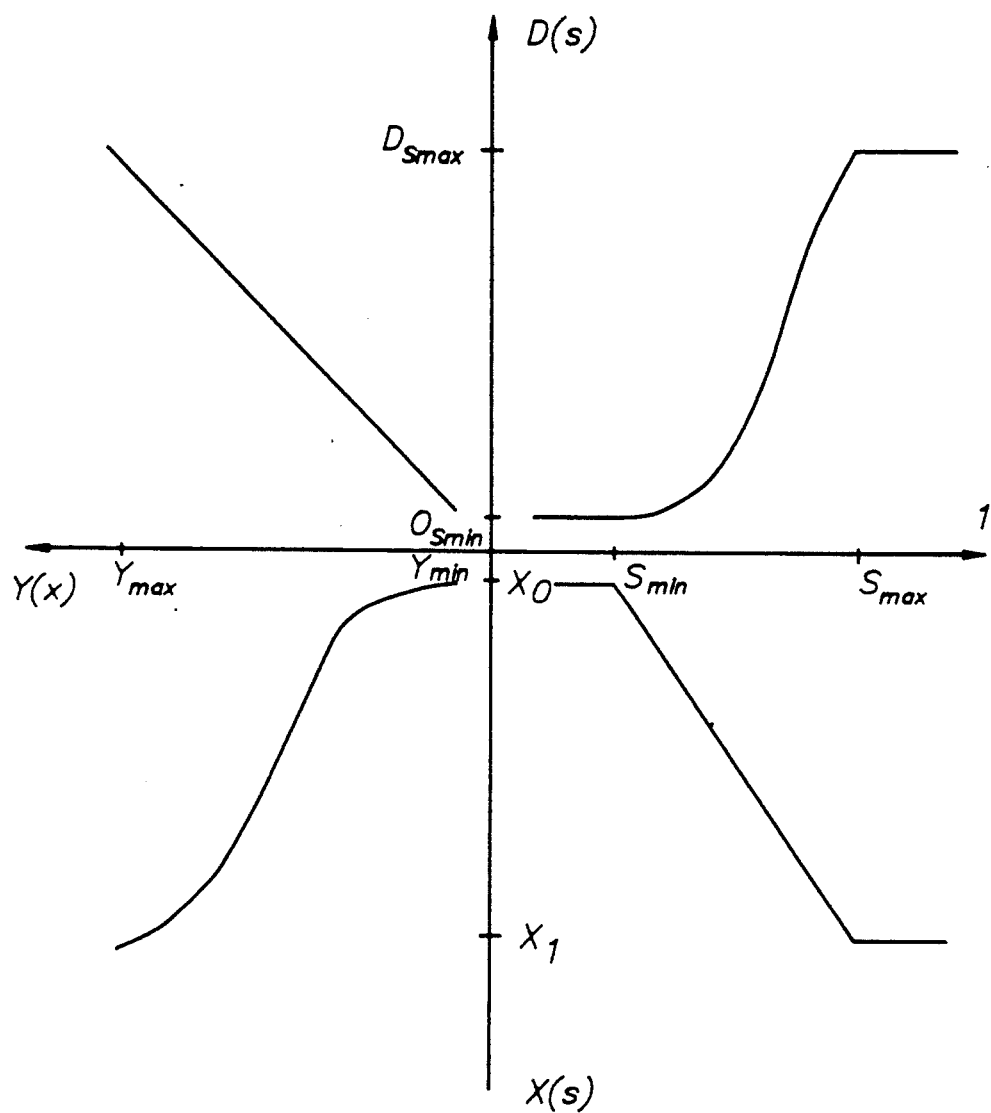
FIG. 3 illustrates the method of defining a gradation curve starting from a given canonical function Y(x).

The way in which this gradation curve was defined in accordance with the present invention is illustrated by means of FIG. 3 wherein the quadrants are humerated in clockwise order starting from the upper left corner.

First the minimum density value $D_{smin}$ and the maximum density value $D_{smax}$ envisioned in the hard copy were defined, $D_{smin}$ was equal to fog density and $D_{smax}$ was equal to 3.0.

Figure 5:
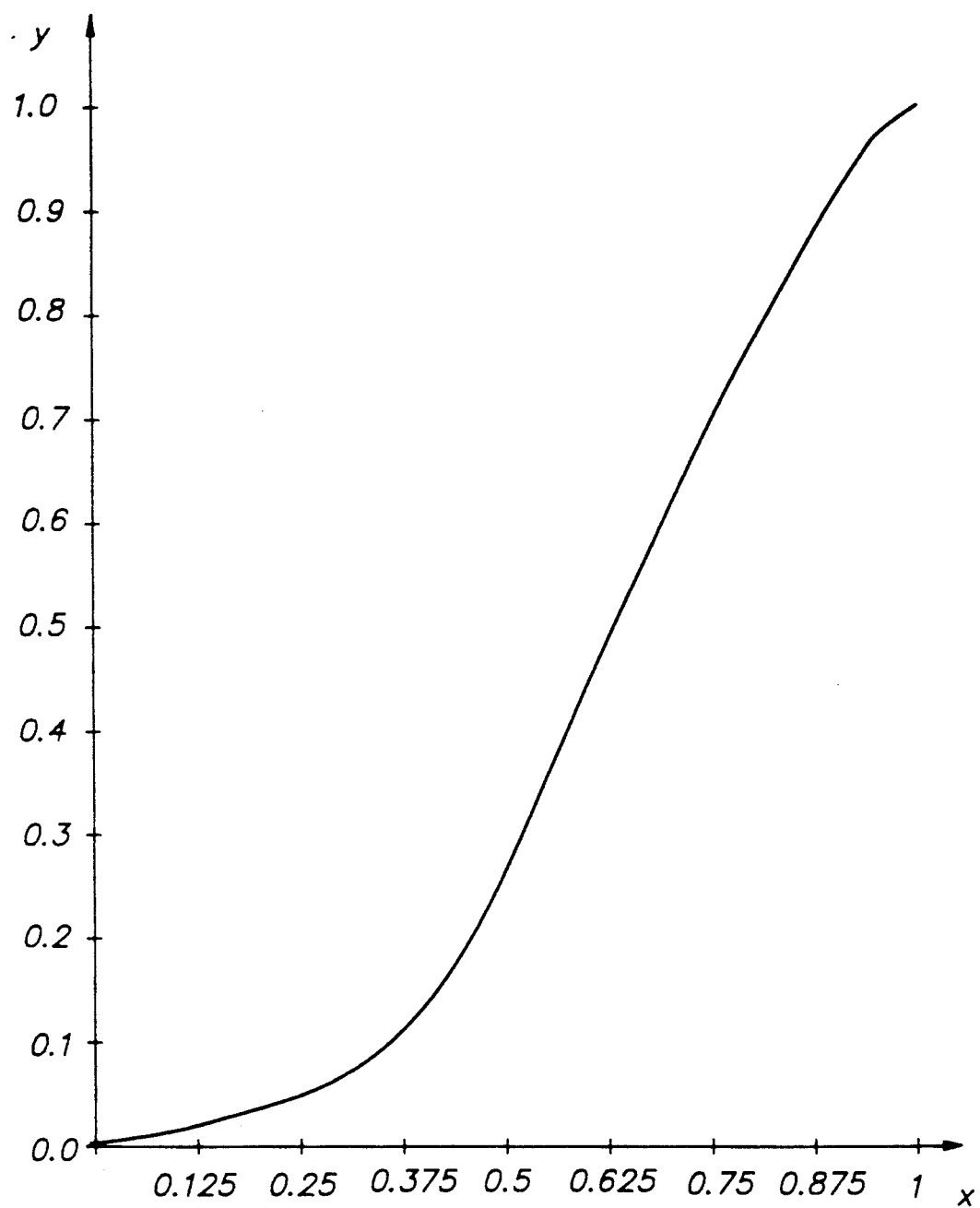
FIG. 5 and FIG. 6 are examples of canonical functions that can be used for creating a gradation curve.
Figure 6:
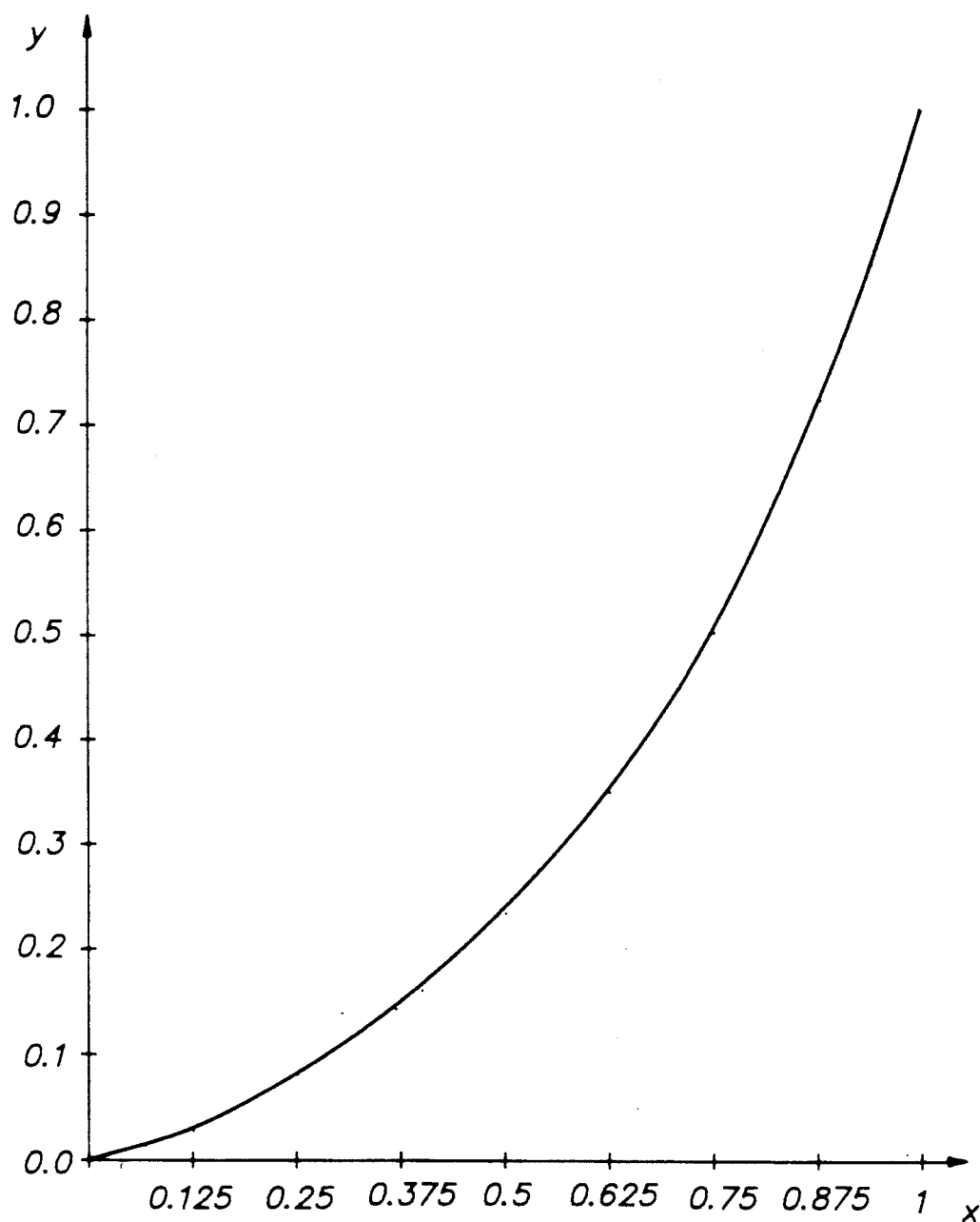

Then a canonical function defined in an orthogonal coordinate system between $x_0$, $x_1$ and $Y_{min}, Y_{max}$ was retrieved from the internal memory of the signal processor. An example of such a curve is depicted in the fourth quadrant of FIG. 3. Specific embodiments are shown in FIGS. 5 and 6.

Next two values $S_{min}$ and $S_{max}$ were determined that constitute a range wherein the conversion of signal values onto density values is determined by the specific shape of the canonical function. Signal values smaller than $S_{min}$ are mapped onto $D_{smin}$, signal values greater than $S_{max}$ are mapped onto $D_{smax}$.

In this embodiment the latitude of said range was a fixed value L=1.5 log exposure (corresponding with the latitude of a conventional x-ray film the radiologist is used to work with) and the position of $S_{min}$ was determined relative to the diagnostically relevant signal range. $S_{max}$ was then calculated as $S_{min}+L$.

For determining the position of $S_{min}$ relative to the relevant signal range, the extreme values $S_0$ and $S_1$ of the diagnostically relevant signal range were first determined by evaluation of the image histogram.

Then a small offset $dS_1=0.3$ log E was added to $S_1$. This ensures that the density in the hard copy corresponding with the maximum value of the diagnostically relevant signal range does not become too dark.

The positioning of the range $S_{max}-S_{min}$ relative to the range $S_1-S_0$ was performed by aligning a fraction of the latter range with the same fraction of the former range.

Mathematically this fraction can be expressed as $A(S_1+dS_1-S_0-dS_0)$.

Then the alignment can be formulated mathematically as $S_{min}=S_0+dS_0+A(S_1+dS_1-S_0-dS_0)-A.L$ and $S_{max}=S_{min}+L$, A being an integer value greater than or equal to 0 and smaller than or equal to 1.

Figure 4A:
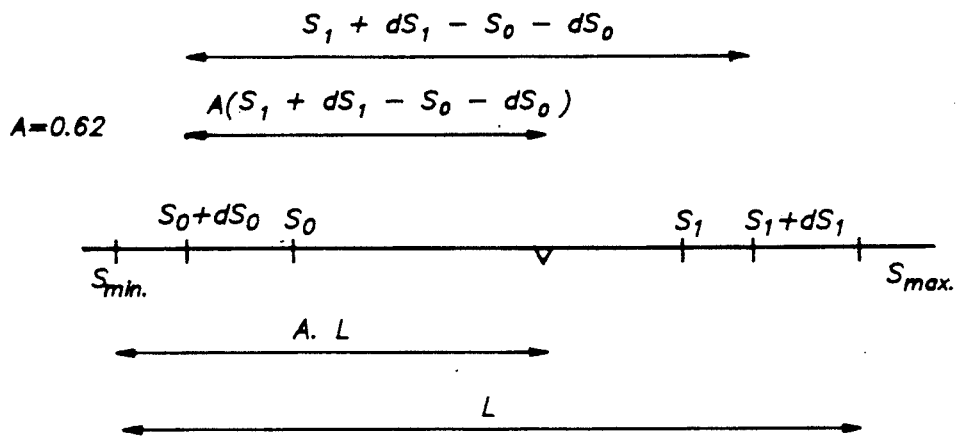
FIG. 4a-b illustrate the alignment of the range confined by $S_{min}$ and $S_{max}$ with the diagnostically relevant signal range defined by $S_0$ and $S_1$.

This mathematical formulation is illustrated in FIG. 4a for A:0.62.

Figure 4B:
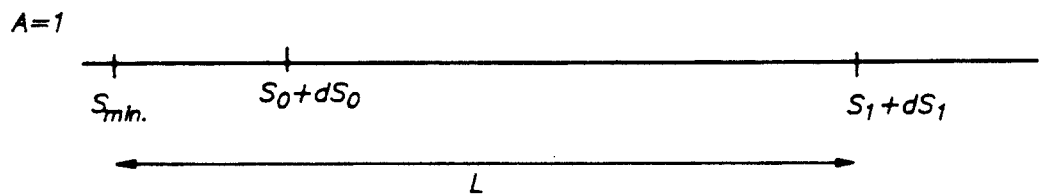

The embodiment wherein A was equal to 1 and $dS_0$ was equal to zero is illustrated in FIG. 4b.

Next the curve is calculated as $D(s)=D_{smin}+(Y(x(s))-y_{min}) \cdot (D_{smax}-D_{smin}) / (Y_{max}-Y_{min})$ wherein D(s) is the density in the reproduction as a function of the signal value s and wherein $x(s)=x_0$ if s is smaller or equal than $S_{min}$, $x(s)=x_0+(s-S_{min}).(x_1-x_0)/(S_{max}-S_{min})$ if s is comprised between $S_{min}$ and $S_{max}$, and $x(s)=x_1$ if s is larger or equal to $S_{max}$. The function x(s) is shown in FIG. 3, second quadrant.

Finally the signal is processed on the basis of this gradation curve and the processed signal is then applied to a digital to analog converter, the output of the converter modulates the output of a laser recorder 6 for making a hard-copy on photographic film.

This kind of gradation processing has been applied to a series of radiation images of chest radiographs.

The alignment of the range $S_{min}$ to $S_{max}$ relative to the diagnostically relevant range between $S_0$ and $S_1$ is performed as hereinbefore described. In these reproductions a quasi constant density was obtained in the darkest part of the lungs and the change of contrast in the remaining part of the image is identical in each of the reproductions, it was independent of the thickness of the patient that was irradiated. The canonical function shown in FIG. 5 was used. The shape of this function approximates the gradation curve of a known photographic film and the outlook of the reproduction was very familiar to the radiologist.

The addition of a small offset value $dS_1$ to $S_1$ as described hereinbefore provides that the density in the darkest part of the lungs does not become too high.

It was also possible to subtract a small offset value $dS_0$ from $S_0$, in this example $dS_0$ was equal to zero.

Alternatively the latitude between $S_{min}$ and $S_{max}$ was not fixed but was adapted to the latitude of the diagnostically relevant signal range determined by evaluation of the histogram. The adaption was however limited within predetermined margins defined as a minimum latitude $L_{min}$ and a maximum latitude $L_{max}$.

Mathematically this can be formulated as follows:

$$S_{max} = S_{min} + L \text{ and}$$
$$S_{min} = S_0 + dS_0 + A \cdot (S_1 + dS_1 - S_0 - dS_0) - A \cdot L$$

wherein $L = L_{min}$ if $L_{min} > S_1 + dS_1 - S_0 - dS_0$;
$L = S_1 + dS_1 - S_0 - dS_0$ if $L_{min} <= S_1 + dS_1 - S_0 - dS_0 <= L_{max}$;
$L = L_{max}$ if $S_1 + dS_1 - S_0 - dS_0 > S_{max}$, and wherein $-L_{max}/2 <= dS_0 <= L_{max}/2$ and $-L_{max}/2 <= dS_{l0} <= L_{max}/2$.

This embodiment was applied for the reproduction of a series of chest radiographs. The set values for the different parameters were the following: $dS_0 = 0$; $dS_1 = 0.1 \log E$, $A = 0$, $L_{min} = 1.2 \log E$; $L_{max} = 1.8 \log E$; $D_{smax} = 3.0$; the canonical function that was used is shown in FIG. 6.

In the reproductions of chest radiographs a quasi constant density was obtained in the mediastinum ($D = 0.2$). The contrast in the mediastinum and in the lungs is good in every reproduction provided that the effective latitude between the minimum and the maximum of the diagnostically relevant data determined by evaluation of the histogram is smaller than 1.8. In case this effective latitude exceeds 1.8, the contrast in the darkest parts of the lungs becomes zero.

Hence, whether the embodiment of the present invention characterised by a fixed latitude or the embodiment characterised by a limited-variable latitude is selected depends on the subject wherein the radiologist is interested. In the present application one should preferably choose the embodiment incorporating a fixed latitude when the field of interest is situated in the lungs, whereas the embodiment incorporating a limited-variable latitude is to be chosen when the field of interest is situated the mediastinum.

I claim:

1. An image reproducing method comprising the steps of:
   (a) scanning a stimulable phosphor screen storing a radiation image with stimulating rays;
   (b) detecting the light emitted upon simulation;
   (c) converting said detected emitted light into a digital signal representation;
   (d) creating a gradation curve for mapping the signal values of said digital signal representation onto corresponding density values, said gradation curve being created by the steps of:
      (i) defining a canonical monotonical non-constant function $Y(x)$ in an orthogonal coordinate system $(x,y)$ between arbitrary values $x_0$ and $x_1$ and $y_{min}$ and $y_{max}$;
      (ii) determining minimum and maximum density values $D_{smin}$ and $D_{smax}$;
      (iii) determining minimum and maximum signal values $S_{min}$ and $S_{max}$ constituting a range wherein the gradation is defined by the canonical form and outside of which signal values will be mapped onto $D_{smin}$ or $D_{smax}$;
      (iv) defining the gradation curve as $$D(s) = D_{smin} + (Y(x(s)) - y_{min}) \cdot (D_{smax} - D_{smin})/(y_{max} - y_{min})$$

wherein $D(s)$ is the density in the reproduction as a function of the signal value s
   $x(s) = x_0$ if s is smaller than or equal to $S_{min}$
   $x(s) = x_0 + (s - S_{min}) \cdot (x_1 - x_0)/(S_{max} - S_{min})$ if s is comprised between $S_{min}$ and $S_{max}$ and
   $x(s) = x_1$ if s is larger than or equal to $S_{max}$
   (e) recording a hard copy image reproduction of said digital signal on a recording material utilizing said gradation curve to control density values in said hard copy image.

2. A method according to claim 1 wherein $Y(x)$, $S_{min}$, $S_{max}$ and $D_{smax}$ are determined as a function of an examination type and $D_{smin}$ is equal to the fog level of the recording material.

3. A method according to claim 1 wherein $S_{max} = S_{min} + L$, L is a constant latitude value envisioned in a reproduction of said image and $S_{min}$ is determined by aligning a signal value at a predetermined relative position between $S_{min}$ and $S_{max}$ with a signal value at the same predetermined relative position between $S_0 - dS_0$ and $S_1 + dS_1$ wherein $S_1 - S_0$ is the diagnostically relevant signal range and wherein $dS_0$ and $dS_1$ are offset values comprised in the range confined by $-L/2$ and $L/2$.

4. A method according to claim 1 wherein the signal is converted into a logarithmic quantity log exposure before being digitized and wherein $dS_0$ and $dS_1$ are situated between $-0.3$ log exposure and $0.3$ log exposure.

5. A method according to claim 1 wherein $S_{max} = S_{min} + L$ and $$S_{min} = S_0 + dS_0 + A(S_1 + dS_1 - S_0 - dS_0) - A \cdot L$$

wherein L is equal to a predetermined value $L_{min}$ if $L_{min}$ is greater than $S_1 + dS_1 - S_0 - dS_0$ or equal to a predetermined value $L_{max}$ if $L_{max}$ is smaller than $S_1 + dS_1 - S_0 - dS_0$ or L is equal to $S_1 + dS_1 - S_0 - dS_0$ if $S_1 + dS_1 - S_0 - dS_0$ is comprised between $L_{min}$ and $L_{max}$ and wherein A is a constant value between 0 and 1, $dS_0$ and $dS_1$ are offset values comprised between $-L_{max}/2$ and $L_{max}/2$.

6. A method according to claim 5 wherein $Y(x)$, $S_{min}$, $S_{max}$ and $D_{smax}$ are determined as a function of an examination type, and $D_{smin}$ is equal to the fog level of the recording material.

7. A method according to claim 5 wherein the signal is converted into a logarithmic quantity log exposure before being digitized and wherein $dS_0$ and $dS_1$ are situated between $-0.3$ log exposure and $0.3$ log exposure.

8. The hard copy image reproduction produced by the method of claim 1.

9. The hard copy image reproduction produced by the method of claim 2.

10. The hard copy image reproduction produced by the method of claim 3.

11. The hard copy image reproduction produced by the method of claim 4.

12. The hard copy image reproduction produced by the method of claim 5.

13. The hard copy image reproduction produced by the method of claim 6.

14. The hard copy image reproduction produced by the method of claim 7.

* * * * *